3,218,272
FLAME-RETARDANT POLYURETHANE FOAMS
Gene Nowlin, Princeton, and Daniel Warren, East Brunswick, N.J., assignors to FMC Corporation, New York, N.Y., a corporation of Delaware
No Drawing. Filed Sept. 5, 1962, Ser. No. 221,450
2 Claims. (Cl. 260—2.5)

This invention relates to flame-retardant polyurethane foams, and more particularly, to improved flame-retardant polyurethane foams derived from tris(hydroxypropyl) phosphate.

It has been suggested that tris(hydroxypropyl) phosphate may be reacted with toluene diisocyanate to form polyurethane foams which have some degree of flame resistance. However, when the flame properties of these polyurethane foams are measured by ASTM Test Method D1692–59T, the foams burn. Moreover, these compositions have the disadvantage that they undergo excessive shrinkage during cure.

It is an object of this invention to provide polyurethane compositions based upon tris(hydroxypropyl) phosphate which are non-burning by ASTM Test Method D1692–59T and which do not shrink significantly during cure.

This and other objects will become apparent from the following description of this invention.

We have now discovered certain polyurethane foam compositions based upon tris(hydroxypropyl) phosphate, having the combined properties of being non-burning while at the same time not shrinking significantly during cure, which comprise the condensation products of (a) 1 hydroxyl equivalent weight of a polyol component containing (1) about 65–85% by weight of tris(hydroxypropyl) phosphate having the formula $$O=P[O(C_3H_6O)_nH]_3$$

in which $n$ equals 1.4–2.5 and (2) about 15–35% by weight of a polyether polyol derived from reaction of 1 hydroxyl equivalent of a polyol selected from the group consisting of sorbitol and sucrose with at least about 1 oxirane equivalent of propylene oxide, said polyether polyol having a hydroxyl number of at least about 400, and (b) at least about 1 isocyanate equivalent weight of chlorinated m-phenylene diisocyanate containing at least about 35% by weight of chlorine.

It is quite surprising that these polyurethane foam compositions possess superior properties, since foams derived from tris(hydroxypropyl) phosphate and chlorinated m-phenylene diisocyanate, but not containing any polyether polyol, not only shrink excessively, but are also extremely friable. Moreover, the shrinkage of prior foams derived from tris(hydroxypropyl) phosphate and toluene diisocyanate cannot be overcome by the simple addition of a polyether polyol. The compositions of this invention also have the advantage of being non-burning by ASTM Test Method D1692–59T.

The polyol component of the polyurethane foam compositions disclosed herein contains about 65–85% by weight of tris(hydroxypropyl) phosphate, and for best results, should contain about 70–80% tris(hydroxypropyl) phosphate. The phosphate is prepared by reacting phosphoric acid with at least about 4 moles of propylene oxide. The neutralization of phosphoric acid with propylene oxide is illustrated by the following equation:

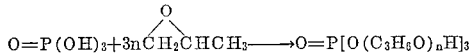

in which $n$ equals 1.4–2.5. After 3 moles of propylene oxide have condensed with each mole of phosphoric acid, the excess propylene oxide condenses with the generated hydroxyl group, thereby increasing the molecular weight of the phosphate.

The reaction of phosphoric acid and propylene oxide can be carried out in the presence of a solvent, such as dioxane, or in the absence of solvent. When large amounts of solvent are used, neutral products, in which $n$ equals about 1.4, can be obtained; without solvent, $n$ is generally in the range of about 2–2.5 in order to obtain a neutral product. The hydroxyl number of the tris(hydroxypropyl) phosphate is about 500 when $n$ equals 1.4 and about 330 when $n$ equals 2.5. The preparation of these phosphates is fully taught by Adams and Shoemaker in U.S. Patent No. 2,372,244.

The polyether polyols used in accordance with this invention are prepared by the reaction of at least 6 moles of propylene oxide with each mole of sorbitol, or at least 8 moles of propylene oxide with each mole of sucrose. The condensation of one hydroxyl group of a polyol, RpOH, with propylene oxide is illustrated by the following equation:

Since this reaction takes place with each hydroxyl group contained in the polyol, the condensation product contains at least one ether linkage and one hydroxyl group for each hydroxyl group originally present in the polyol. When more than one oxirane equivalent of propylene oxide is reacted with each hydroxyl equivalent of polyol, the excess propylene oxide condenses with the generated hydroxyl group, thereby forming additional ether linkages and increasing the molecular weight. The polyether polyol should have a hydroxyl number of at least about 400 and preferably at least about 450.

The polyether polyol should comprise about 15–35% of the polyol component of the polyurethane foam. It is required that the polyether polyol be at least about 15% of the polyol component in order to reduce the shrinkage and friability of the foam to acceptable levels. When more than 35% of the polyol component is polyether polyol, non-burning foams are not obtainable because of the lowered phosphorus content in the final foam composition. Preferably, about 20–30% of the polyol component is polyether polyol derived from the condensation of propylene oxide with sorbitol or sucrose.

The novel flame-retardant polyurethane compositions taught herein are prepared by condensing about 1 hydroxyl equivalent weight of polyether polyol with at least about 1 isocyanate equivalent weight of chlorinated m-phenylene diisocyanate; 1 hydroxyl group being equivalent to 1 isocyanate group. In practice, a slight excess of diisocyanate, for example, about 5% excess, is generally added to insure complete reaction. When water is used to generate the blowing agent for the foam, larger excesses of diisocyanate are used. Generally about 1–1.5 isocyanate equivalents are present for each hydroxyl equivalent.

Chlorinated m-phenylene diisocyanates can be prepared by chlorinating m-phenylene diisocyanate using a ferric chloride catalyst at elevated temperatures. A suitable process for chlorinating m-phenylene diisocyanate is taught by J. J. Tazuma in Patents Nos. 2,915,545 and 2,945,875. The chlorination reaction proceeds stepwise, and thus can be terminated so as to form a product containing predominantly any desired degree of chlorination, that is, monochloro-, dichloro-, trichloro-, or tetrachloro-m-phenylene diisocyanate.

Chlorinated m-phenylene diisocyanates are normally solid and must be warmed to form a liquid which can be blended with the polyol component used in accordance with this invention. Although this blending can be accomplished with normally solid diisocyanate in this manner, it is much simpler to use liquid blends of chlorinated m-phenylene diisocyanates.

Chlorinated m-phenylene diisocyanate which is liquid at about room temperature can be prepared by blending chlorinated m-phenylene diisocyanate fractions which are chlorinated to different degrees. For example, liquid mixtures containing 35–42%, by weight of chlorine, are prepared by blending various amounts of dichloro-, trichloro-, and tetrachloro-m-phenylene diisocyanate fractions. The liquid blend containing equal amounts of these three fractions has a chlorine content of about 39% by weight. The freezing point of chlorinated m-phenylene diisoyanate blends can be further lowered by the addition of a fourth component such as unchlorinated m-phenylene diisocyanate, monochloro-m-phenylene diisocyanate, or another aromatic diisocyanate such as tolylene diisocyanate. These chlorinated phenylene diisocyanate liquid blends are fully disclosed by C. A. Erickson and D. Warren in copending application Serial No. 202,100, filed June 13, 1962.

High exothermic heats of reaction may be avoided in the preparation of the polyurethane foams of this invention by forming a polyol-diisocyanate quasi-prepolymer containing residual isocyanate groups. This prepolymer is formed by reacting 1 equivalent of diisocyanate with less than 1, for example, about 0.25 equivalent weight of polyol component. The polyurethane composition is then prepared by reacting the quasi-prepolymer with sufficient additional polyol component to provide the desired ratio of about 1 hydroxyl equivalent weight for each isocyanate equivalent weight.

The polyurethane compositions taught herein have useful applications as flame-retardant foams. They are especially useful as rigid flame-retardant insulation materials for the building industry.

The polyurethane foams of this invention are readily prepared by mixing together the polyol component, chlorinated m-phenylene diisocyanate and a blowing agent such as a halogenated hydrocarbon or water. As the reaction between the polyol and the diisocyanate begins, the exothermic heat of reaction vaporizes the halogenated hydrocarbon with a resulting expansion of the reaction medium into a foam. When water is used as the blowing agent, it reacts with excess diisocyanate liberating carbon dioxide which expands the reaction medium. Small amounts of additional components such as catalysts and emulsifiers are generally used to alter the handling characteristics of the reaction mixture or the properties of the foam.

In the illustrative examples which follow, the flame-retardance of the polyurethane foams was measured in accordance with ASTM Test Method D1692–59T. Samples of the foam measuring 2 x 6 x ½ inch were marked by drawing lines 1 inch and 5 inches from one end of each sample. Thus, each sample was divided into three sections measuring 1 inch, 4 inches, and 1 inch. A wing-tipped Bunsen burner flame was applied to one end of the sample until the burning reached the 1-inch line, or for a period of 1 minute, whichever was shorter. If the 1-inch line was not reached by the burning, the sample was classified as non-burning.

The following examples, illustrating the novel flame-retardant polyurethane compositions disclosed herein, are presented without any intention that the invention be limited thereto. All parts and percentages are by weight.

*Example 1*

Tris(hydroxypropyl) phosphate was prepared as follows: Three hundred eighty parts of propylene oxide were added dropwise to 100 parts of 100% phosphoric acid over a period of 6 hrs. at a temperature of 50–60° C. The reaction mixture was quite viscous until about 40% of the propylene oxide had been added, after which the viscosity decreased. After the addition, stirring was continued for an additional 2 hrs. Excess propylene oxide remaining after this period was stripped off by vacuum at a pot temperature of 70° C. Four hundred twenty-one parts of product having an acid number of 2.8, a hydroxyl number of 363, and a phosphorus content of 6.4% were obtained.

A polyurethane foam was prepared as follows: Eighty parts of the tris(hydroxypropyl) phosphate prepared above, 20 parts of a commerically available polyether polyol, derived from the condensation of 1 mole of sorbitol with 6 moles of propylene oxide, 30 parts of trichlorofluoromethane, 0.52 part of a commerically available silicone emulsifier sold as L–520 by Union Carbide Corp. (a polysiloxane-polyoxyalkylene block copolymer prepared in accordance with U.S. Patent No. 2,834,748), and 0.68 part of stannous octoate as catalyst were blended together by stirring. To this mixture was added 125 parts of a liquid blend of chlorinated m-phenylene diisocyanate containing 39% chlorine obtained by blending equal amounts of tetrachloro-, trichloro-, and dichloro-m-phenylene diisocyanate. This mixture was stirred at a high rate for 14 sec., after which foaming took place. The resulting rigid foam did not shrink, was non-friable, had a density of about 2 lbs./cu. ft. and was non-burning.

*Example 2*

A polyurethane foam was prepared as follows: Sixty-five parts of the tris(hydroxypropyl) phosphate prepared in Example 1, 35 parts of a commercially available polyether polyol derived from the condensation of 8 moles of propylene oxide with 1 mole of sucrose, 30 parts of trichlorofluoromethane, 1 part of an organo-silicone copolymer emulsifier, and 0.5 part of triethylenediamine were blended together by stirring. To this mixture was added 92.5 parts of a liquid blend of chlorinated m-phenylene diisocyanate containing 39% chlorine. The mixture was stirred at a high rate after which foaming took place. The resulting foam was rigid, had fine cells and was non-burning.

*Example 3*

Tris(hydroxypropyl) phosphate was prepared as follows: Thirty-two parts of 100% phosphoric acid were prepared by adding 22.9 parts of 85% phosphoric acid to 9.05 parts of phosphorus pentoxide. This was charged to a stainless steel reactor and 125 parts of propylene oxide were added over a period of 5 hrs. while maintaining the temperature in the range of 71–82° C. The batch was cooled to 38° C. and allowed to stand overnight. Excess propylene oxide was stripped from the product at 65–85° C. and 5 mm. Hg. The yield was 80% of theoretical of a product having an acid number of 1.0, a hydroxyl number of 370 and a phosphorus content of 7.30%.

A polyurethane foam was prepared as follows: Seventy-five parts of the tris(hydroxypropyl) phosphate prepared above, 25 parts of a commercially available polyether polyol derived from the condensation of 6 moles of propylene oxide with 1 mole of sorbitol, 30 parts of trichlorofluoromethane, 0.52 part of an organo-silicone copolymer emulsifier, 0.68 part of stannous octoate and 0.2 part of triethylenediamine were blended together by stirring. To this mixture was added 107 parts of a liquid blend of chlorinated m-phenylene diisocyanate containing 39% chlorine. The mixture was stirred at a high rate after which foaming took place. The foam was rigid, non-friable, did not shrink, and was non-burning.

*Example 4*

A polyurethane foam was prepared as follows: Seventy-five parts of the tris(hydroxypropyl) phosphate having a hydroxyl number of 370, 25 parts of a commercially available polyether polyol derived from the condensation of 8 moles of propylene oxide with 1 mole of sucrose, 28 parts of trichlorofluoromethane, 1 part of an organo-silicone copolymer emulsifier, and 0.5 part of triethylenediamine were blended together by stirring. To this mixture was added 93.5 parts of a liquid blend of chlorinated m-phenylene diisocyanate having a chlorine content of 39%. The mixture was stirred at a high rate after which foaming took place. The resulting foam was rigid, non-friable, did not shrink, had large cells, and was non-burning.

*Example 5*

A tris(hydroxypropyl) phosphate was prepared in a manner similar to Example 1 except that 500 parts of dioxane were used as solvent. The resulting product had a hydroxyl number of 490.

A polyurethane foam was prepared as follows: Eighty parts of the tris(hydroxypropyl) phosphate prepared above, 20 parts of a commercially available polyether polyol, derived from the condensation of 1 mole of sorbitol with 6 moles of propylene oxide, 30 parts of trichlorofluoromethane, 0.5 part of a silicone emulsifier and 0.68 part of stannous octoate as catalyst were blended together by stirring. To this mixture was added 121 parts of a liquid blend of chlorinated m-phenylene diisocyanate containing 35% chlorine obtained by blending 30 parts of tetrachloro-m-phenylene diisocyanate, 30 parts of trichloro-m-phenylene diisocyanate, 30 parts of dichloro-m-phenylene diisocyanate and 10 parts of m-phenylene diisocyanate. This mixture was stirred at a high rate for 14 sec., after which foaming took place. The resulting rigid foam did not shrink, was non-friable, had a density of about 2.5 lbs./cu. ft. and was non-burning.

*Example 6*

A polyurethane foam was prepared as follows: Seventy parts of the tris(hydroxypropyl) phosphate having a hydroxyl number of 363, 30 parts of a commercially available polyether polyol derived from the condensation of 6 moles of propylene oxide with 1 mole of sorbitol, 30 parts of trichlorofluoromethane, 0.52 part of an organo-silicone copolymer emulsifier, and 0.68 part of stannous octoate were blended together by stirring. To this mixture was added 111.5 parts of a blend of chlorinated m-phenylene diisocyanate having a chlorine content of 39%. The mixture was stirred at a high rate after which foaming took place. The resulting foam was rigid, non-friable, had a density of 2.9 pounds per cubic foot, and was non-burning.

*Example 7*

A polyurethane foam was prepared as follows: Seventy-five parts of the tris(hydroxypropyl) phosphate having a hydroxyl number of 363, 25 parts of a commercially available polyether polyol derived from the condensation of 6 moles of propylene oxide with 1 mole of sorbitol, 30 parts of trichlorofluoromethane, 0.52 part of an organo-silicone copolymer emulsifier, 0.43 part of stannous octoate, and 0.15 part of triethylenediamine were blended together by stirring. To this mixture was added 106 parts of a liquid blend of chlorinated m-phenylene diisocyanate containing a chlorine content of 39%. The mixture was stirred at a high rate for 9 sec. after which foaming took place. The resulting foam was rigid, non-friable, had a density of 2.5 lbs./cu. ft., had fine cells and was non-burning.

*Example 8*

A polyurethane foam was prepared as follows: Eighty parts of the tris(hydroxypropyl) phosphate containing a hydroxyl number of 363, 25 parts of a commercially available polyether polyol derived from the condensation of 6 moles of propylene oxide with 1 mole of sorbitol, 30 parts of trichlorofluoromethane, 0.52 part of an organo-silicone copolymer emulsifier, 0.34 part of stannous octoate, and 0.15 part of triethylenediamine were blended together by stirring. To this mixture was added 102.5 parts of a liquid blend of chlorinated m-phenylene diisocyanate containing 39% chlorine. The mixture was stirred at a high rate for 10 sec. after which foaming took place. The resulting foam was rigid, only slightly friable, shrank only slightly, had good cell structure, and was non-burning.

*Example 9*

A polyurethane foam was prepared as follows: Eighty-five parts of the tris(hydroxypropyl) phosphate having a hydroxyl number of 363, 15 parts of a commercially available polyether polyol derived from the condensation of 6 moles of propylene oxide with 1 mole of sorbitol, 30 parts of trichlorofluoromethane, 0.52 part of the organo-silicone copolymer emulsifier, 0.34 part of stannous octoate, and 0.15 part of triethylenediamine were blended together by stirring. To this mixture was added 99.4 parts of a liquid blend of chlorinated m-phenylene diisocyanate containing 39% chlorine. The mixture was stirred at a high rate for 10 sec., after which foaming took place. The foam was rigid, non-friable, shrank only slightly, had good cell structure, a density of 2.5 lbs./cu. ft. and was non-burning.

*Example 10*

A quasi-prepolymer was prepared as follows: Eighty-eight parts of a liquid blend of chlorinated m-phenylene diisocyanate containing 39% chlorine were heated to 60° C. While blanketing the reaction with dry nitrogen gas, 12 parts of a commercially available polyether polyol derived from the condensation of 6 moles of propylene oxide with 1 mole of sorbital were added dropwise while agitating the reaction medium. After the addition was completed, the medium was agitated for an additional 30 min. at 50–60° C. and the quasi-prepolymer was allowed to cool.

A polyurethane foam was prepared as follows: To 60.5 parts of a tris(hydroxypropyl) phosphate, prepared using dioxane as the solvent and having a hydroxyl number of 472, was added 50 parts of trichlorofluoromethane, 0.5 part of triethylamine, 0.5 part of stannous octoate and 2.5 parts of an organo-silicone copolymer emulsifier. The quasi-prepolymer prepared above was then added to this mixture and they were combined by the action of a high speed mixer for 49 sec., after which foaming took place. The resulting foam was rigid, non-friable, did not shrink, had fine cells, a density of 2.0 lbs./cu. ft. and was non-burning.

As will be apparent to those skilled in the art, numerous modifications and variations of the formulations specifically illustrated above may be made without departing from the spirit of the invention or the scope of the following claims.

We claim:

1. A non-burning polyurethane foam composition having improved properties comprising the reaction product of
(a) 1 hydroxyl equivalent weight of a polyol component containing
(1) 65–85% by weight of a tris(hydroxypropyl) phosphate having the formula $$O=P[O(C_3H_6O)_nH]_3$$

in which $n$ equals 1.4–2.5 and
(2) 15–35% by weight of a polyether polyol derived from the reaction of 1 hydroxyl equivalent of a polyol selected from the group consisting of sorbitol and sucrose with at least 1 oxirane equivalent of propylene oxide, said polyether polyol having a hydroxyl number of at least 400, and
(b) at least 1 isocyanate equivalent weight of chlorinated m-phenylene diisocyanate containing at least 35% by weight chlorine formed in the presence of a blowing agent.

2. A non-burning polyurethane foam composition having improved properties comprising the reaction product of
(a) 1 hydroxyl equivalent weight of a polyol component containing (1) 70–80% by weight of a tris(hydroxypropyl) phosphate having the formula $$O=P[O(C_3H_6O)_nH]_3$$

in which $n$ equals 1.4–2.5 and
(2) 20–30% by weight of a polyether polyol derived from the reaction of 1 mole of sorbitol with 6 moles of propylene oxide and
(b) 1 to 1.5 isocyanate equivalent weight of chlorinated m-phenylene diisocyanate containing 35–42% by weight chlorine formed in the presence of a blowing agent.

References Cited by the Examiner

UNITED STATES PATENTS 2,915,545  12/1959  Tazuma _____ 260—453
3,085,085  4/1963  Wismer et al. _____ 260—2.5

FOREIGN PATENTS 1,106,489  5/1961  Germany.
876,469  9/1961  Great Britain.

LEON J. BERCOVITZ, *Primary Examiner.*